United States Patent [19]

Wissmann

[11] Patent Number: 5,711,349

[45] Date of Patent: Jan. 27, 1998

[54] FLOW DIVIDER WITH DIVERTER VALVE

[75] Inventor: Siegfried R. Wissmann, Cincinnati, Ohio

[73] Assignee: Cincinnati Milacron Inc., Cincinnati, Ohio

[21] Appl. No.: 781,253

[22] Filed: Jan. 10, 1997

Related U.S. Application Data

[62] Division of Ser. No. 419,306, Apr. 10, 1995, Pat. No. 5,616,350.

[51] Int. Cl.⁶ ............................................. F16K 11/02
[52] U.S. Cl. ..................... 137/876; 425/382.4; 425/464
[58] Field of Search ......................... 425/382 R, 382.4, 425/461, 464, 467, 463; 137/872, 876, 625.46, 625.47

[56] References Cited

U.S. PATENT DOCUMENTS

| | | | |
|---|---|---|---|
| 3,199,537 | 8/1965 | Swanson | 137/625.47 |
| 3,545,489 | 12/1970 | Brown et al. | 137/876 |
| 3,901,636 | 8/1975 | Zink et al. | 425/463 |
| 4,049,105 | 9/1977 | Kindersley | 137/625.47 |
| 4,055,280 | 10/1977 | Kohl et al. | 137/625.46 |
| 4,836,250 | 6/1989 | Krambrock | 137/876 |
| 4,840,028 | 6/1989 | Kusuda et al. | 137/876 |

Primary Examiner—Jay H. Woo
Assistant Examiner—Joseph Leyson
Attorney, Agent, or Firm—Stephen H. Friskney

[57] ABSTRACT

The present invention provides a dual flow divider for use on an extruder. The flow divider is configured to separate the melt stream received from the extruder at a central entry into two flow channels, the respective channels being formed as nearly to identical (mirror image) as is practically possible. The relative flow in the respective channels can be varied by rotating a diverter valve that extends to a position adjacent the central entry of the flow divider, i.e., where the flow begins to divide. The flow channels and control end of the diverter valve are specially configured to avoid any shape or surface conditions that would impose heat-generating restrictions to material flow, and/or allow areas of stagnation in the flow stream. More specifically, the flow channels are machined to provide smooth, streamlined transitions at all points along the flow path. The surfaces of the flow channels which intersect with the diverter valve do so at a sharp edge; this geometry blends the surfaces of the channels and valve while also serving as a "wiper" when the valve is rotated.

2 Claims, 8 Drawing Sheets

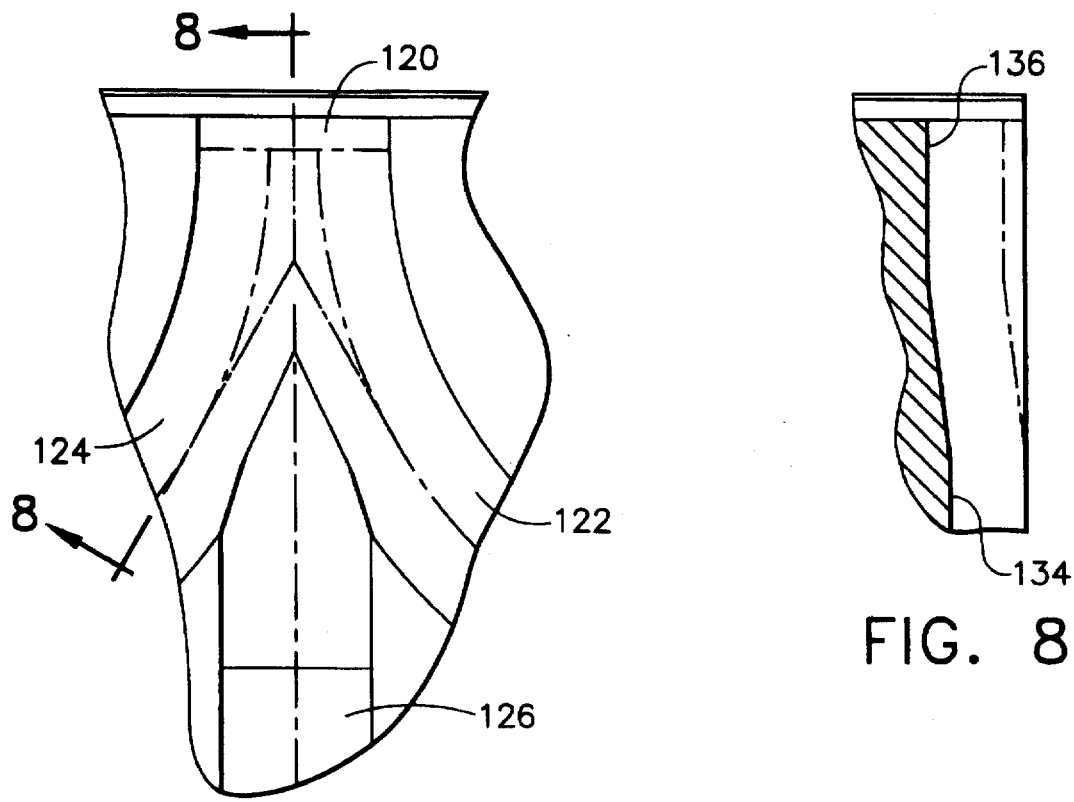
FIG. 6
FIG. 8
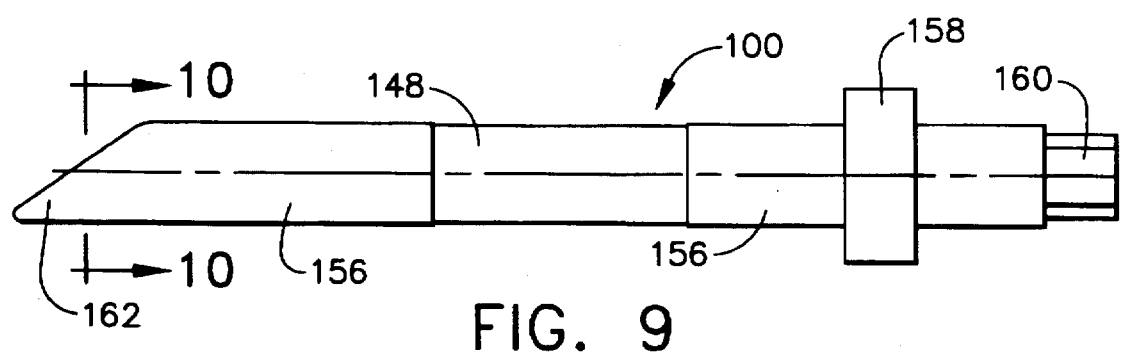
FIG. 9
FIG. 10

FLOW DIVIDER WITH DIVERTER VALVE

RELATED APPLICATION

This is a division of application Ser. No. 419,306, filed Apr. 10, 1995, U.S. Pat. No. 5,616,350.

BACKGROUND OF THE INVENTION

1. Field of the Invention

The present invention relates to a flow divider used with an extruder to separate the plastic melt into two flow paths, and more particularly, to such a flow divider that includes diverter means to adjust and balance the melt flow in the respective flow paths.

2. Description of the Related Art

Given the various sizes of thermoplastic extrusions and the varying capacities of extruders, it is sometimes advantageous for one extruder to supply the thermoplastic material in sufficient quantity to supply two or more dies. In addition, new techniques for producing coextrusions can take advantage of multiple melt streams from a single extruder; for example, a coextrusion system using two extruders, each of which produce two melt streams that are combined to produce two finished profiles would be desirable. Nevertheless, the idea of extruding several streams of plastic melt simultaneously from a single extruder is not new. In principle, it involves simply subdividing the main flow of material just after it exits the extruder into two or more melt streams which supply the respective extrusion dies. While this approach sounds straight-forward, there are actually several variables that affect the quality of the results. For example, the dies used with the flow divider may be different in design or have different flow characteristics. In addition, the separate flow paths (as many as four) which carry the melt will seldom have identical flow properties. Where the process involves coextrusion with a thin outer layer, balanced material supply is particularly important.

The above mentioned variables result in different melt flow resistance in the separate paths, requiring some means to balance the flow, accommodate varying processing conditions and adjust the relative output from the respective dies. More specifically, it has been found advantageous to be able to alter the flow rate in any of the partial flows by some control means to avoid local variations of pressure which would affect the quality or processability of the extrusion. Although various adjustment means have been suggested by the prior art, there remains a need for improvement in apparatus of this type, particularly where multiple materials are combined in a coextrusion.

Further problems are encountered in a flow divider where it is required to process materials that are very sensitive to heat gradients and prone to degradation as a result. Such materials are significantly affected by irregularities in the flow path which can result in localized "hot spots", causing burning or other degradation of material properties. In particular, areas in the flow path where the plastic melt is forced past a corner or over a sharp edge physically work the material generating additional heat and creating the potential for overheating. Furthermore, there may be areas of the flow path where the plastic melt tends to stagnate rather than flow continually; when thermoplastic material remains heated for an extended period, its properties will degrade over time, making it unsuitable for use in the extruded product. For dividing heads that are used to process heat sensitive materials, it is highly desirable to provide flow paths which present smooth transitions and minimize stagnation as the plastic melt flows from the extruder to the die.

The prior art has failed to provide a flow divider with the capabilities to adjust the flow proportionately in the respective paths while also avoiding complex path geometry which would create conditions that tend to degrade the properties of heat sensitive materials.

SUMMARY OF THE INVENTION

Accordingly, an object of the present invention is to provide a flow divider for an extruder that includes the capability of adjusting the flow in the respective paths and is compatible with coextrusion applications. A further object is to configure the adjustment mechanism and flow paths to avoid any irregularities or surface variations which would adversely affect performance when the flow divider is used with heat sensitive materials.

To accomplish these objectives, the present invention provides a flow divider that is constructed in two halves to facilitate machining optimal geometry for the material flow path. More specifically, the flow path is configured to divide the flow received by a central entry into two separate flow channels, the respective channels being formed as nearly to identical (mirror image) as is practically possible. The relative flow in the respective channels can be varied by rotating a diverter valve that extends to a position adjacent the central entry of the flow divider, i.e., where the melt stream begins to divide. The control end of the diverter valve is specially configured to avoid any shape or surface conditions that would impose heat-generating restrictions to material flow, and/or allow areas of stagnation in the flow stream. Furthermore, the flow channels are machined to provide smooth, streamlined transitions at all points along the flow path. The surfaces of the flow channels which intersect with the diverter valve do so at sharp edges. This blends the surfaces of the channels and valve while also serving as a "wiper" when the valve is rotated.

BRIEF DESCRIPTION OF THE DRAWINGS

FIG. 6 is an enlarged view of the area in the divider body shown in FIG. 5 where the flow channels and valve bore intersect.

FIG. 8 is a section view of the portion of the divider body as shown in FIG. 6 taken along line 8—8.

FIG. 9 is a front elevational view of the diverter valve in accordance with the present invention.

FIG. 10 is a sectional view of the diverter valve shown in FIG. 9 taken along the line 10—10.

DESCRIPTION OF THE PREFERRED EMBODIMENT

Figure 1:
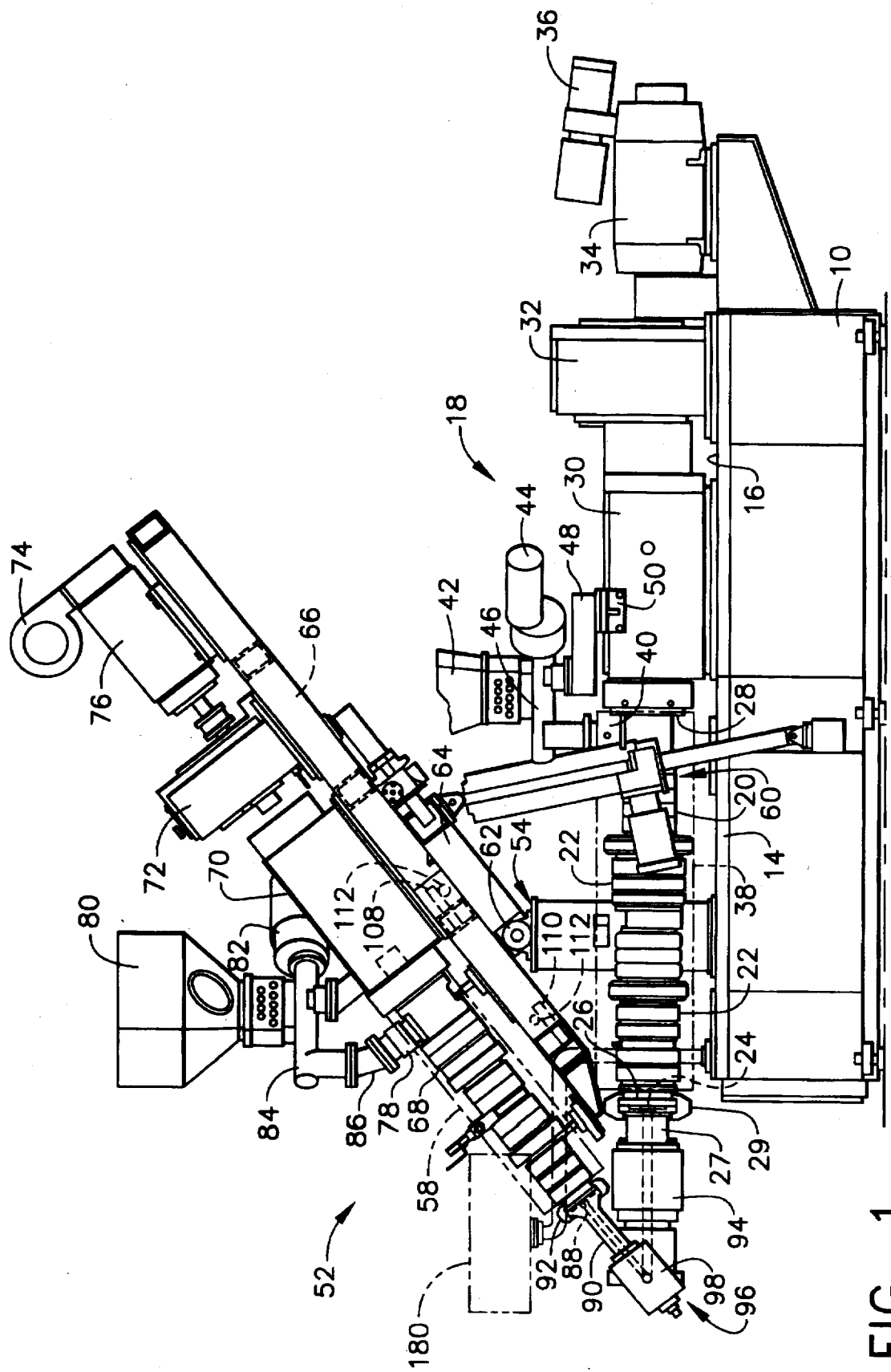
FIG. 1 is a side elevational view of extrusion apparatus including a flow divider assembly according to present invention and configured for dual coextrusion by providing a second extruder is positioned above a first extruder.
Figure 2:
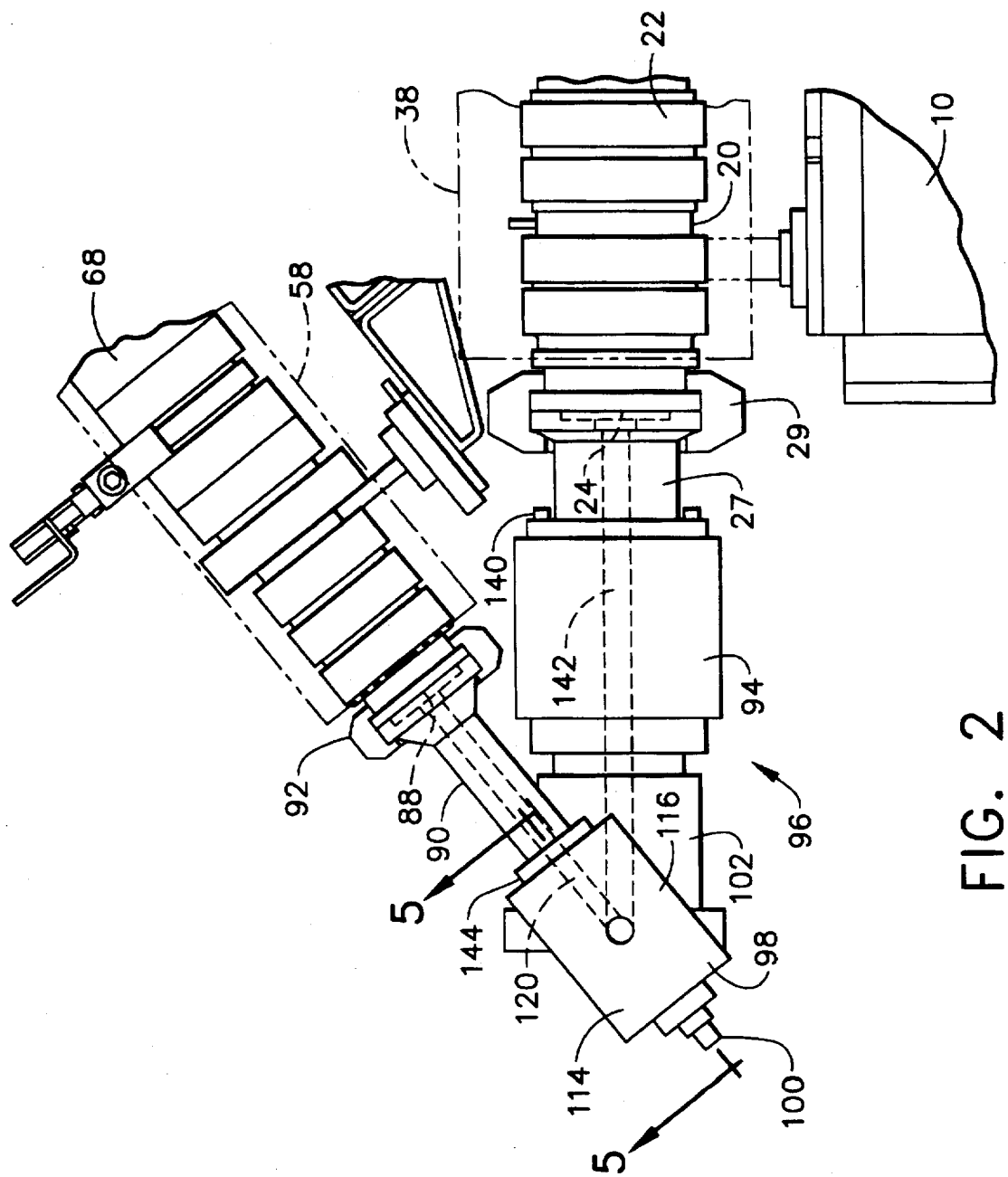
FIG. 2 is an enlarged side elevational view of the output end of the extrusion apparatus shown in FIG. 1, focusing on the flow divider assembly according to the present invention with certain portions broken away for clarity.

In order to clarify the features of the preferred embodiment, the present invention will be described in conjunction with the tooling involved in coextruding two profiles. Referring to the drawings, and particularly to FIGS. 1 and 2 thereof, there is shown a coextrusion arrangement including a first, lower extruder 18 and a second upper extruder 52, each of which provides plasticated material to a flow divider and extrusion die assembly 96. This arrangement of the two machines permits the extrusion of a predetermined shape from different materials, or from common base materials that each include different additives, such as color, for providing coextruded articles in a single extrusion operation.

Preferably, with respect to the present invention, the two extruders 18, 52 are operated to provide a core material and a skin material to the flow divider and extrusion die assembly 96. The output from each of the extruders is divided into two flow paths to enable simultaneous extrusion of two profiles. Accordingly, there is a flow divider 94 for the core material and a flow divider 98 with a diverter valve 100 for the skin material. While only the flow divider 98 for the skin material is shown with diverter 100, it should be apparent that the novel aspects concerning the diverter 100 and flow channels in the dividers 94, 98 are equally applicable to either flow divider assembly. Accordingly, in some cases, similar elements sharing a common function are given like reference numerals in both of the flow dividers 94, 98.

First extruder 18 is positioned so that its longitudinal axis is disposed substantially horizontally, while second extruder 52 is positioned above first extruder 18 and has its longitudinal axis disposed at an angle to that of first extruder 18. The coextrusion arrangement is supported on a machine base 10 defined by a generally rectangular, box-type frame having an overall structure that is well known to those skilled in the art. Base 10 includes a base plate 14 at its uppermost portion, base plate 14 preferably being oriented so that its upper surface 16 lies substantially in a horizontal plane.

Carried by and secured to uppermost surface 16 of base plate 14 is first extruder 18 that incorporates a tubular extruder barrel 20 that has its axis extending in a substantially horizontal direction. Barrel 20 includes an inner, rotatable plastication screw (not shown) and a plurality of outer, resistance-type heater bands 22 to apply heat to the exterior of barrel 20. Heater bands 22 aid in softening the plastic material while the material is mechanically worked by the plastication screw and as the material is being conveyed within barrel 20 in a direction toward the barrel outlet 24 by the plastication screw. Barrel 20 includes a forward flange 26 at outlet 24, and it also includes a drive end 28 that permits a drive coupling (not shown) to couple the plastication screw with a drive gear system 30 which, in turn, is coupled with a reduction gearbox 32 that receives power from a screw drive motor 34. A drive motor cooling blower 36 is carried by the motor casing of motor 34.

Barrel 20 includes an outer cover 38 that has a generally rectangular cross section and that has its inner surfaces spaced from the outer surface of barrel 20 and from the outer surfaces of heater bands 22. Adjacent drive end 28 of barrel 20 is a plastics material inlet 40 that receives pelletized or powdered plastic material that is placed in a feed hopper 42. The material is transported to inlet 40 by means of a feed screw drive motor 44 that drives a feed screw (not shown) carried within a feed screw housing 46. Hopper 42 and feed screw housing 46 are partially supported by the casing of drive gear system 30 by a feeder support member 48 that is carried by a support bracket 50.

Second extruder 52 is also supported by machine base 10 and is carried on a pedestal 54 that extends upwardly from base plate 14. Pedestal 54 carries a support cradle 64 that, in turn, carries an upper extruder support frame 66, which is a generally rectangular structure formed from a plurality of box-type beams of known construction. In order to accommodate various die configurations, the second extruder 52 is capable of angular and linear movement with respect to the first extruder 18. The support cradle 64 pivots on a shaft 62, with the angular position being determined by extension or retraction of jackscrews 60 connected between the base 10 and support cradle 64. As shown, support frame 66 includes parallel track members 108, 110 which engage a plurality of interiorly positioned, longitudinally aligned rollers 112. This construction permits the upper extruder support frame 66 to be shifted slidably along the support cradle 64 so that the extruder outlet 88 can be axially aligned and connected with divider 98.

As noted above, support frame 66 carries second extruder 52 and its related drive system. Included on support frame 66 are an extruder barrel 68 with cover 58, a rotatable extruder screw (not shown) positioned within the barrel 68, a screw drive coupling (not shown), a gearing system 70, a gearbox 72, and a drive motor 76 along with a drive motor cooling blower 74. Second extruder 52 and related components carried by support frame 66 are similar in structure and function to the corresponding parts forming a part of first extruder 18. Consequently, second extruder 52 includes a material inlet 78 that is in communication with a plastic material feed hopper 80 for receiving pelletized or powdered plastics material. A material feed screw drive motor 82 rotates a feed screw (not shown) carried within a feed screw housing 84 to carry the plastics material from feed hopper 80 to material inlet 78. As shown, because of the angular orientation of second extruder 52, relative to first extruder 18, a feed conduit adapter 86 is provided to permit feed screw housing 84 to be oriented so that its longitudinal axis is substantially in a horizontal plane.

Second extruder 52 includes a barrel outlet 88 that includes a flange for connection of outlet 88 with a die entry adapter 90 by means of a split ring clamp 92. First extruder 18 includes a die entry adapter 27 that is also connected with first extruder outlet 26, by means of a split clamp 29. Each of die entry adapters 27, 90 is so configured that it can be easily connected at suitable connectors on the flow dividers 94, 98 of assembly 96, so that plasticated material can be conveyed from the respective first and second extruders 18, 52 to the assembly 96 where the flows of skin and core material are each divided then combined to form two coextruded profiles of predetermined shape. Preferably, the entry adapters 27, 90 are provided with a bore 105 for connecting a melt thermocouple and/or a bore 106 to receive a probe for melt pressure, or other suitable sensors.

Referring now to FIG. 2, the die entry adapters 27, 90 for the first and second extruders are connected to the respective extruder outlets 24, 88 by means of split clamp rings 29, 92. First extruder die entry adapter 27 is connected with core material flow divider 94 by a plurality of bolts 140 so that the flow passage in die entry adapter 27 is interconnected with first flow passage 142 in flow divider 94. Second extruder die entry adapter 90 is connected with a split flange arrangement 144 to interconnect securely the flow passage in die entry adapter 90 with second flow inlet passage 120 in flow divider 98. The plastic melt passes from the respective extruders 18, 52 into flow dividers 94, 98 and through appropriate connectors which equalize the flow velocities of the respective streams of plastics material, as required. In particular, flow divider 98 includes diverter valve 100 to provide the capability to alter the flow within the passages of the divider during the extrusion process, as will be more fully described later. The materials then flow into extrusion dies 102, 104 and ultimately issue as the defined profile configuration. As is readily apparent, many types of die housings for forming various extruded shapes can be provided, as desired.

Figure 3:
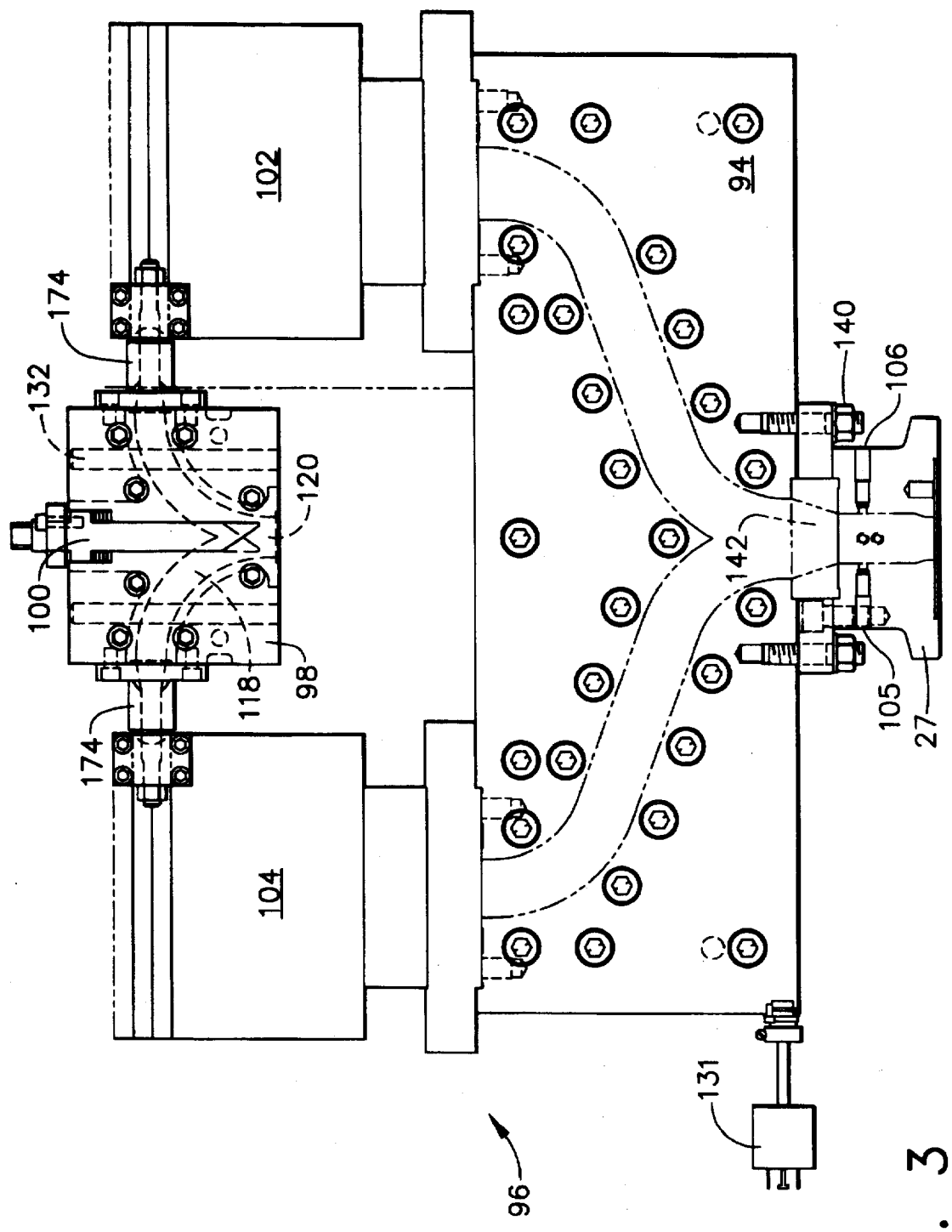
FIG. 3 is a top plan view of the divider assembly shown in FIG. 2, with certain portions broken away for clarity.
Figure 5:
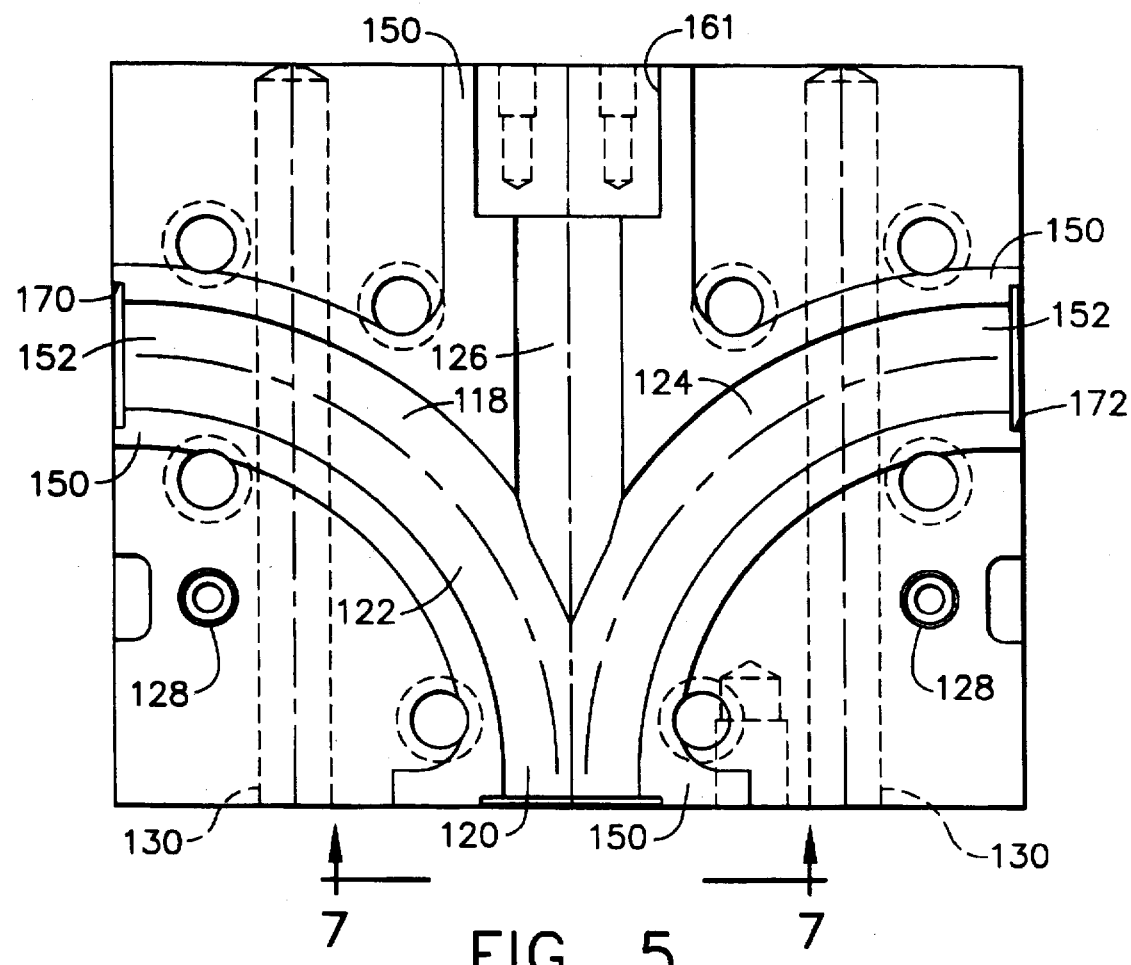
FIG. 5 is a top view of half of the body of the skin material flow divider taken along line 5—5 of FIG. 2; for clarity, separable elements are not shown.

Referring to FIGS. 2, 3 and 5, there are shown the flow dividers 94, 98 according to the present invention, designed to separate the streams of plasticized core and skin material into two flow streams, enabling simultaneous extrusion of two profiles. Referring to the flow divider 98 as representative of the preferred construction, its body is made in two halves 114, 116 which are machined from rectangular steel blocks. The halves 114, 116 are essentially identical (see FIG. 5) with respect to forming a material flow path 118 having a flow entry 120 and subsequently dividing into two flow channels 122, 124. Similarly, the halves 114, 116 are machined to form a bore 126 to receive the diverter valve 100. More specifically, equal portions of the flow path 118 and bore 126 are formed in each half of the flow divider body, so that the desired configurations are fully formed when the halves 114, 116 are fastened together. To facilitate connecting the body halves 114, 116, through holes are provided in half 114 and threaded holes are provided in half 116 so that they can be connected together by bolts 127. To insure accurate alignment of the halves 114, 116 and precise forming of the flow path 118 and bore 126, it is preferable to provide holes 128 at two locations in each of the halves 114, 116 which receive alignment pins (not shown).

Figure 4:
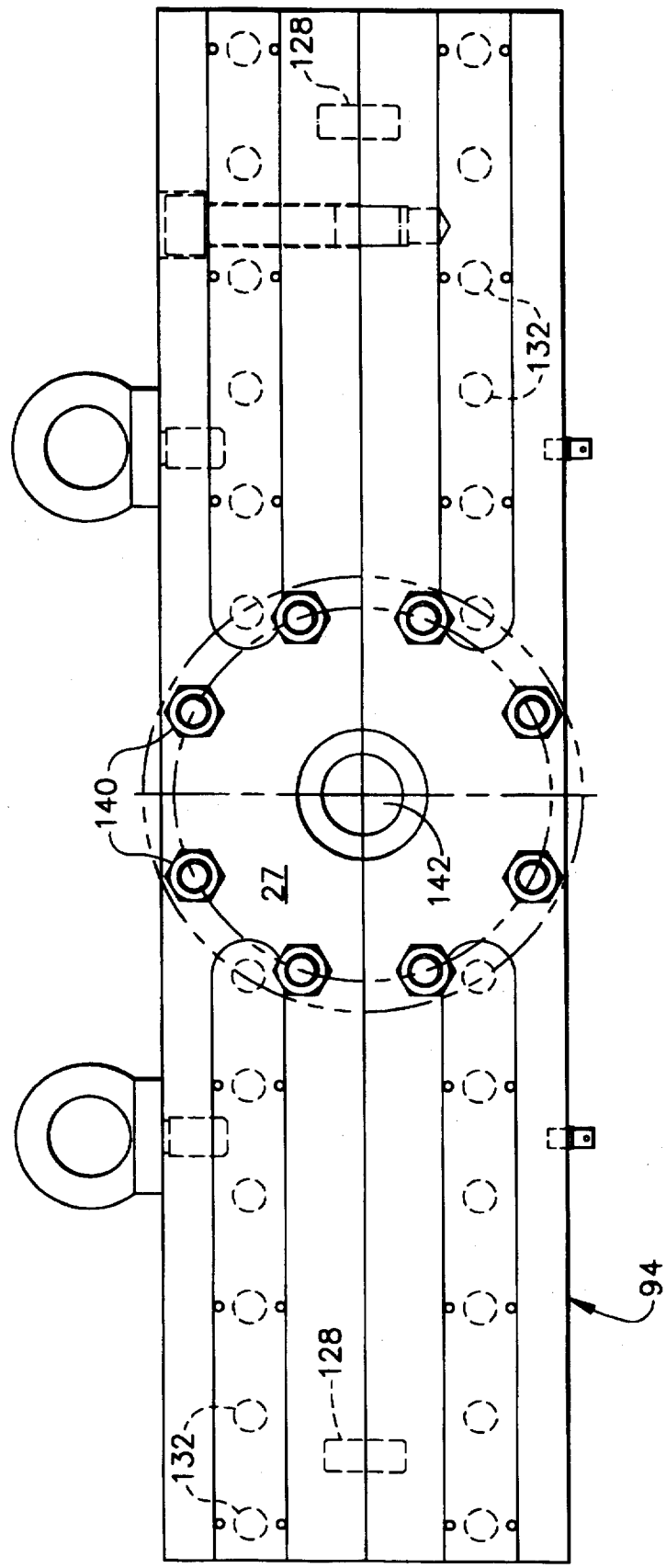
FIG. 4 is an end view of the core material flow divider of the assembly shown in FIG. 3; specifically, the end adjacent the extruder.

To facilitate uniform flow of plastic melt through the flow channels 122, 124, it is preferable to provide heating means within each half 114, 116 of the dual flow divider 98. Although various forms of heating elements would be suitable for this purpose, the embodiment shown in the FIGS. 1 through 4 includes a series of suitably placed bores 130 to receive electric cartridge heaters 132 which can be controlled as required for consistent operation. To maximize the temperature control capability on flow dividers that are relatively large, such as the core material divider 94, it is preferable to have the heaters 132 grouped in independently controlled zones (see FIG. 4). For example, four banks of four heaters are shown, each bank of heaters 132 having a suitable connector 131 (FIG. 3) for interface with the machine control 180.

Figure 7:
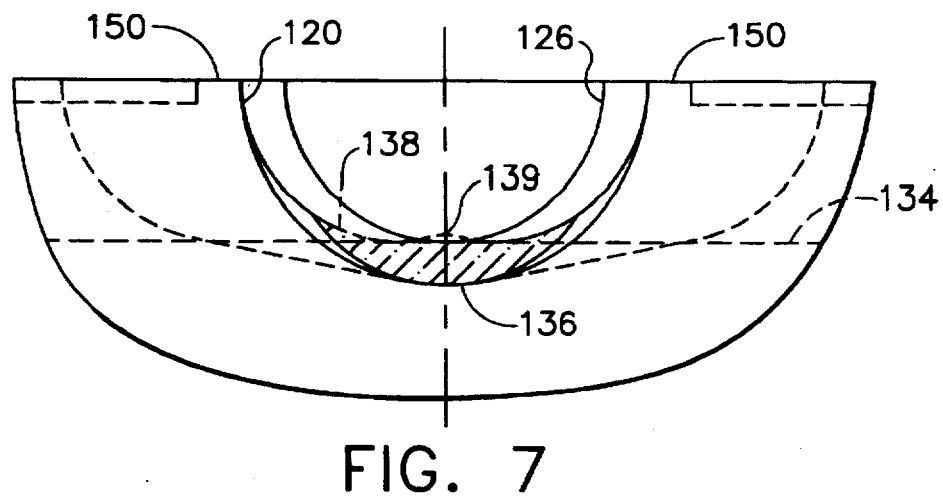
FIG. 7 is a partial end view of the divider body half as shown in FIG. 5 taken along line 7—7.

Referring now to FIGS. 5–7, the material flow path 118 will be discussed in greater detail. Each of the channels 122, 124 are essentially circular in cross-section when the divider body is assembled, a semicircular portion of the channel being machined in each half 114, 116 of the divider body. For example, adequate performance has been achieved by a flow divider having a channel diameter of 30 mm when used with a standard size extruder. As noted earlier, the flow channel 122 and 124 diverge from the flow entry 120. Preferably, the entry 120 is larger in area than the respective flow paths; a diameter of 40 mm is compatible with the 30 mm channel diameter suggested.

As shown in the drawings, the entry 120 and subsequent separation into the separate channels 122, 124 is designed to avoid heat generating corner geometry, as well as areas where the stream of plastic melt would tend to stagnate. There are several specific elements in the design that contribute to this capability. Primarily, as seen in FIGS. 7 and 8, each of the channels 122, 124 is deepened from its normal depth 134 to a deeper section 136 where the two channels merge to provide an enlarged opening at the entry 120. The phantom line at 138 in FIG. 7 illustrates the boundary of the material that is removed by the deeper section 136 to improve the entry 120 of flow path 118. If the material at 138 were not removed, it would present a configuration which would restrict flow and tend to generate heat, resulting in a burning condition for heat sensitive materials, particularly at the corner formed at 139. Another point regarding the construction of the flow divider 98 is the provision of a sealing ledge 150 along the entire material flow path 118. Specifically, the ledge 150 extends not only along the channels 122, 124, but also forms a seal around the exits 152 and along the entry 120 of the halves 114, 116.

Figure 11:
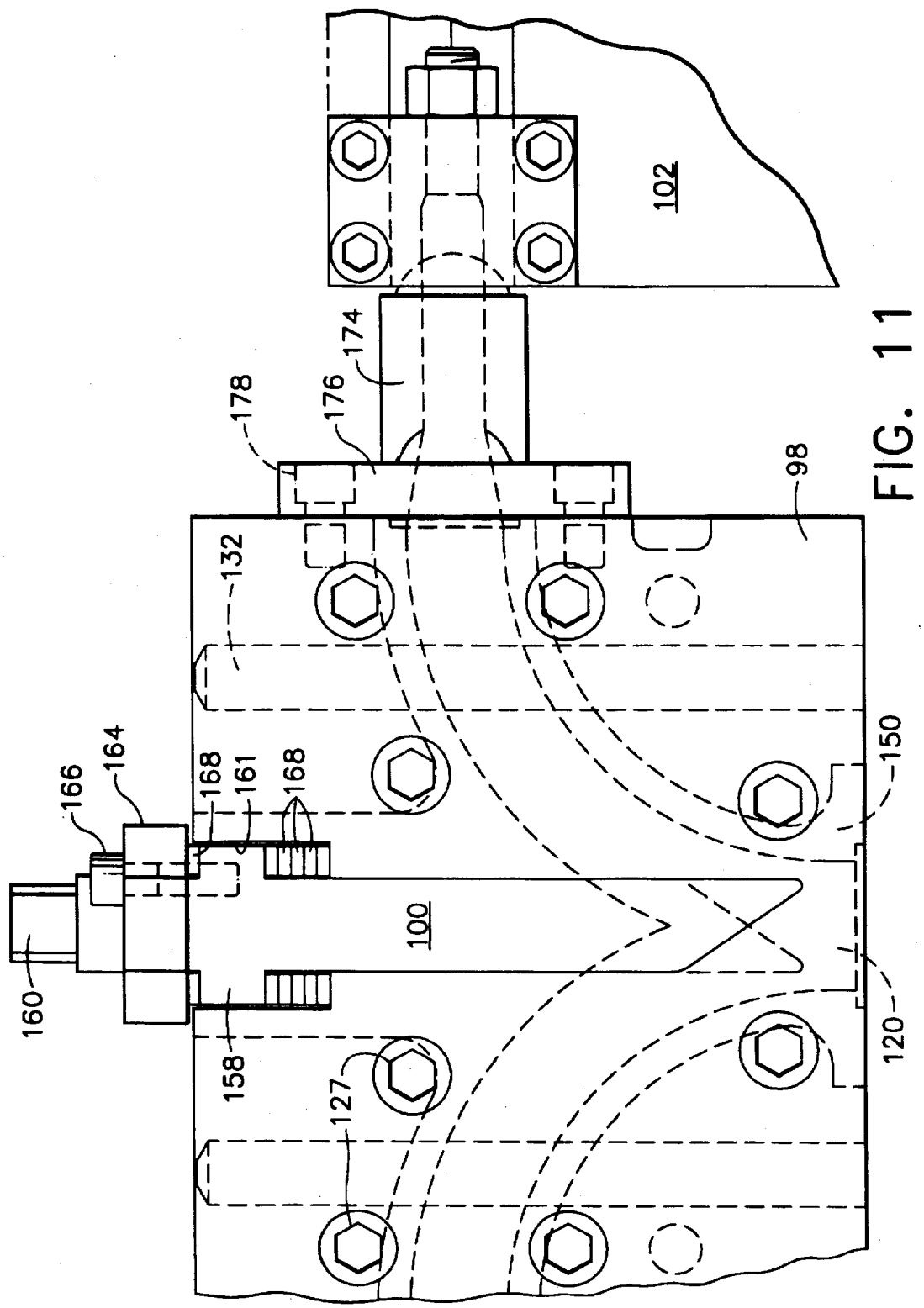
FIG. 11 is an enlarged, fragmentary view of the skin material flow divider of the assembly shown in FIG. 3.

As noted previously, an important feature of the flow divider 98 is the provision of a diverter valve 100. As shown in FIGS. 9, 10 and 11, the valve 100 has an elongated body 148 with bearing surfaces 156 that are received in the bore 126 formed by the assembled halves 114, 116. The valve 100 also has a retaining shoulder 158 and a head 160 that are important for adjustment of the valve 100, as will be more fully discussed later. The valve 100 has a diverter end 162 that is designed to enter the material flow path 118 adjacent the entry 120 just before the flow is divided into channels 122, 124. As seen in the drawings, the diverter end 162 of the valve 100 is specially designed, as by rounding all edges and streamlining surfaces to avoid any corners or other geometry that would adversely affect the flow of heat sensitive material past the diverter end 162 of valve 100.

The diverter valve 100 is held in the dual flow diverter 98 by means of a retaining plate 164 and bolts 166 which serve to trap the shoulder 158 in a recess 161 of bore 126. To enhance the adjustment capability of valve 100, it is desirable to provide a stack of washers 168 adjacent the shoulder 158 in the recess 161. The washers 168 can be put on either side of the retaining shoulder 158 to determine how far the diverter end 162 of the valve 100 will extend from the bore 126 into the flow path 118 adjacent the entry 120.

As best seen in FIG. 11, at the exit end of each of the channels 122, 124, there are counterbores 170, 172 to receive an extrusion die adapter 174, or other appropriate die interface. The die adapter 174 is typically held in place by a retaining ring 176 and bolts 178.

The operation of the dual flow dividers 94, 98 of the present invention will now be described in connection with their use on "piggy-back" extruders, as shown. Each of extruders 18 and 52 is operated in the normal manner; that operation can be accomplished in any conventional manner, as through a single operator control panel 180 containing the necessary switches, indicators, and controls. Simultaneous flows of plastics materials from each of the extruders enter the respective flow dividers, steams of each material are combined at the dies 102, 104 and issue as a single coextruded profile. For example, an extruded section that can be used for siding for homes can be extruded using a base (core) material of polyvinyl chloride resin that flows from extruder 18. A cap stock or skin material can be arranged to flow from second extruder 52 to form a thin cover layer over the core material. The color, ultraviolet absorbers, and other expensive additives can be confined to the skin material, to thereby reduce the quantity of such additives that is needed, and thereby reduce the cost of the finished extruded product.

More specifically, each extruder produces plastic melt which exits the extruder under pressure, passing through the entry adapters 27, 90 and into the flow entry 120 of the material flow path 118. In flow divider 98, the flow of plastic melt then encounters the diverter end 162 of the valve 100 just prior to the point where it is forced to separate into the separate channels 122, 124 of the material flow path 118. In effect, the diverter valve 100 is used to vary the relative flow resistance in the separate channels 122, 124. As such, the diverter valve 100 can be used to balance effectively the flow in the respective channels 122, 124 to achieve the desired results. For example, if the extrusion dies 102, 104 at the end of the flow channels 122, 124 are essentially identical in flow resistance, the valve 100 is in a neutral position so that it has minimal effect on the plastic melt as it divides into separate flows. Typically, the valve 100 would be in a neutral position when the operation is started since the relative flow resistance in the respective flow channels 122, 124 is not yet known.

As the results of material processing are gradually revealed, the output of the respective dies 102, 104 is examined for quality and performance. If one profile is disproportionate with respect to the other, the valve 100 is rotated by means of the hex head 160 to alter the position of the diverter end 162. Specifically, the diverter end 162 is positioned so that it begins to obstruct the channel which leads to the die having the larger material flow, while simultaneously reducing the restriction of the other channel. This construction enables adjustment of flow resistance in fine increments to optimize processing without having to stop the extruder. If necessary, the flow rate or output of the extruder can also be altered to achieve the desired production results by means of the dual flow divider and extrusion die assembly 96.

Figure 12:
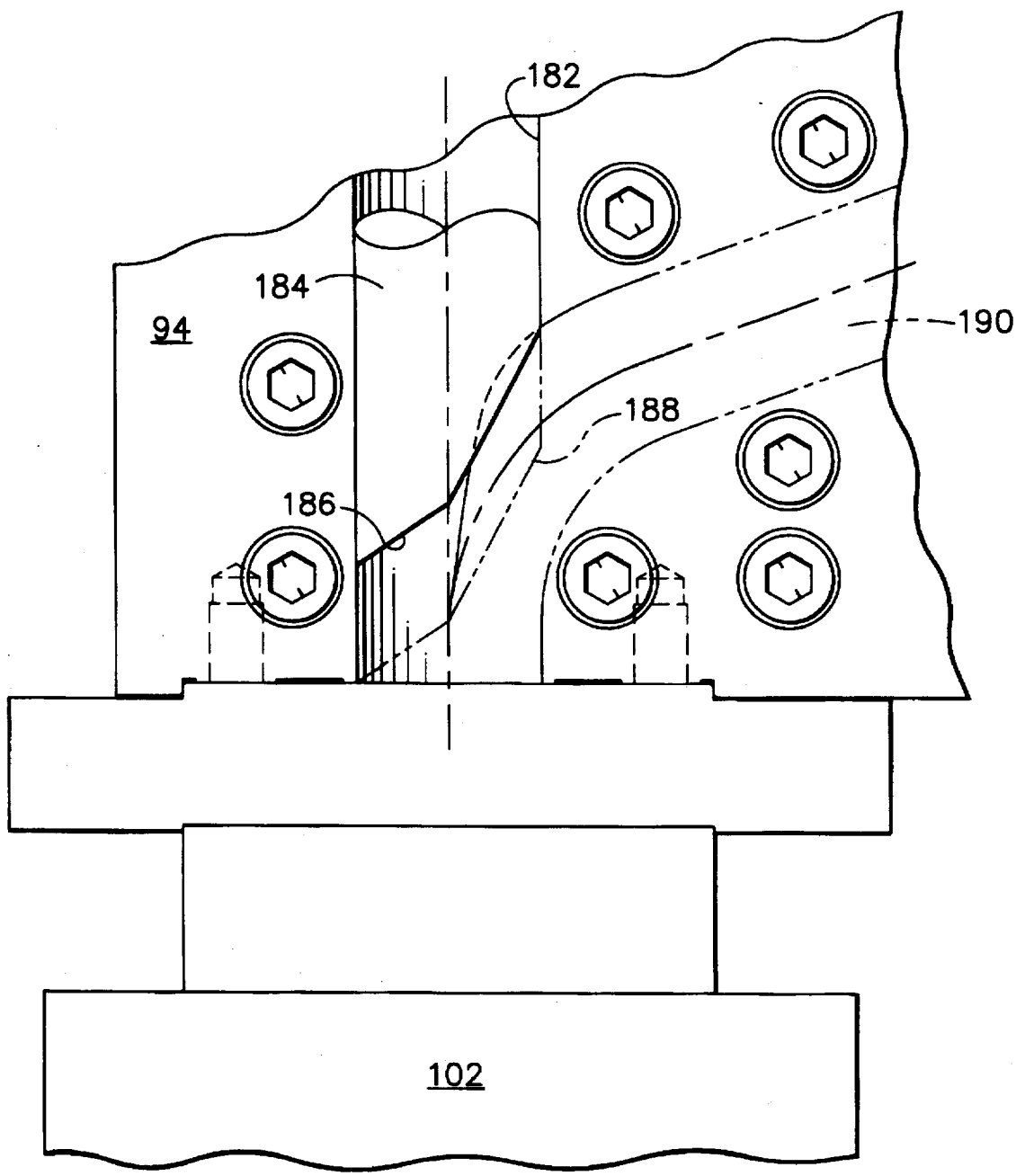
FIG. 12 is an enlarged, fragmentary view of an alternate embodiment of the diverter valve according to the present invention.

An alternate embodiment for a valve arrangement according to the present invention is shown in FIG. 12. In place of, or in addition to, the diverter valve 100 at the point of entry 120 in flow divider 98, as discussed above, two separately adjustable valves can be used near the exits of the flow channels in flow divider 94. The following description of this embodiment will describe only one valve in detail; however, it will be readily apparent that a similar valve is needed in the other flow channel to maximize performance and capabilities of the divider.

More specifically, FIG. 12 shows a segment of the divider 94 where it attaches to the die 102, similar to the right-hand side of the assembly shown in FIG. 3. In this embodiment, a bore 182 is provided in the flow divider 94 to intersect the right-hand channel 190 of flow passage 142 adjacent the point where channel 190 connects with the die 102. Received within the bore 182 is a restrictor valve 184. The valve 184 is fitted for adjustable, linear movement (without rotation) in the bore 182 in any suitable manner, as is well known in the art. For example, the distal end (not shown) of the valve 184 could be threaded for adjustment, and keyed to engage a slot or recess in the divider body, thereby preventing rotation. A nut (not shown), trapped against the divider 94 and concentric with the bore 182, engages the treaded end of valve 184, such that rotation of the nut causes linear displacement of the valve 184.

The valve 184 is shown in its retracted position so that the end 186 has minimal effect on flow of material through the channel 190 when a full volume of flow is desired. In this regard, the end 186 is contoured, as shown, to avoid "dead spots" around the point of entry of the valve 184 into the flow channel 190, while maintaining a rigid geometry for the end 186. The linear adjustment of valve 184 allows its position in the channel 190 to be infinitely variable from the retracted position shown to a fully extended position indicated at 188.

Of course, with two valves 184 positioned in the divider 94 at locations similar to that shown in FIG. 12, it would also be necessary to streamline the contour of the flow channel 190 to minimize dead spots in the area where the bore 182 intersects the channel 190. However, the separate valves 184 provide further flexibility in making the adjustment in flow resistance for the paths leading to the respective dies fully independent of one another.

While the invention has been shown illustrated in some detail according to the preferred embodiment shown in the accompanying drawings, and while the preferred embodiment has been described in similar detail, there is no intention to limit the invention to such detail. On the contrary, it is intended to cover all modifications, alterations, and equivalents falling within the scope of the following claims.

What is claimed is:

1. A flow divider for receiving a melt stream from a plastics extruder and separating the melt stream into first and second flow channels that supply associated extrusion dies, wherein the flow divider includes a diverter valve comprising:

(a) an elongated cylindrical body received within the flow divider and adapted for rotation therein;

(b) a diverter end connected to the elongated cylindrical body and extending into the melt stream where the melt enters the flow divider and begins to separate into the two flow channels, the diverter end being configured to cause resistance to the melt stream entering the respective flow channels, and rotatable through a range of orientations including (i) a first extreme that maximizes resistance to the first flow channel and minimizes resistance to the second flow channel, (ii) a neutral, intermediate orientation that causes equal resistance to the two channels, and (iii) a second extreme that minimizes resistance to the first flow channel and maximizes resistance to the second flow channel; and (c) an actuator end extending out of the flow divider and having means for rotating the elongated cylindrical body through incremental adjustments, such that rotation of the body changes the orientation of the diverter end in the melt stream and varies the relative flow resistance to the first and second flow channels, the flow divider further comprising adjustment means in connection with the diverter valve for varying the distance that the diverter end extends into the melt stream.

2. The apparatus of claim 1, wherein the adjustment means comprises:

(a) a cylindrical recess in the flow divider which encircles the diverter valve where the valve extends out of the flow divider, (b) a shoulder on the valve body adjacent the actuator end, and (c) a plurality of washers placed on the valve body adjacent the shoulder and within the recess in the flow divider.

* * * * *